Aug. 18, 1931.  L. V. FOSTER  1,819,325

OPHTHALMIC LENS

Filed May 25, 1928

| DISC SIDE CURVES | READING ADDITIONS | | | | |
|---|---|---|---|---|---|
|  | .50 | .62 | .75 | .87 | 1.00 |
| +3.00 | 207 | 209 | 210 | 211 | 213 |
| 3.12 | 207 | 208 | 210 | 211 | 213 |
| 3.25 | 207 | 208 | 210 | 211 | 212 |
| 3.37 | 206 | 208 | 209 | 211 | 212 |
| 3.50 | 206 | 208 | 209 | 210 | 212 |
| 3.62 | 206 | 207 | 209 | 210 | 212 |
| 3.75 | 206 | 207 | 209 | 210 | 211 |
| 3.87 | 205 | 207 | 208 | 210 | 211 |
| 4.00 | 205 | 207 | 208 | 209 | 211 |
| 4.12 | 205 | 206 | 208 | 209 | 211 |

| DISC SIDE CURVES | READING ADDITIONS | | | | |
|---|---|---|---|---|---|
|  | .50 | .62 | .75 | .87 | 1.00 |
| +3.00 / 3.12 | 212 | 215 | 218 | 221 | 223 |
| 3.25 / 3.37 | 211 | 214 | 217 | 220 | 222 |
| 3.50 / 3.62 | 210 | 213 | 216 | 219 | 221 |
| 3.75 / 3.87 | 209 | 212 | 215 | 218 | 220 |
| 4.00 / 4.12 | 208 | 211 | 214 | 217 | 219 |

LEON V. FOSTER
INVENTOR

BY Crumpston & Griffith
his ATTORNEYS

Patented Aug. 18, 1931

1,819,325

UNITED STATES PATENT OFFICE

LEON V. FOSTER, OF ROCHESTER, NEW YORK, ASSIGNOR TO BAUSCH & LOMB OPTICAL CO., OF ROCHESTER, NEW YORK, A CORPORATION OF NEW YORK

OPHTHALMIC LENS

Application filed May 25, 1928. Serial No. 280,582.

This invention relates to ophthalmic lenses and more particularly it refers to multifocal lenses which are manufactured by securing a minor lens member, usually of flint glass, in a countersink formed in a surface of a major lens member, usually of crown glass, the refractive index of one member being different from the refractive index of the other member.

One of the most important objects of the present invention is to facilitate the manufacturing and dispensing of multifocal lenses of the character described. Another object is to provide an improved method of manufacturing fused multifocal lenses; a further object is to reduce the errors in the power of the reading portion of fused multifocal lenses; another object is to enable the jobbing optician to supply a multifocal lens of any desired power from a minimum number of lens blanks; and a further object is to provide an improved series of lens blanks for use in the manufacture of fused multifocal lenses. Other objects and advantages reside in certain novel features of construction, arrangement and combination of parts and in the method of making the same, which will hereinafter be more fully described and pointed out in the appended claims.

Referring to the drawings.

Figures 1, 2, 3, 4, 5:
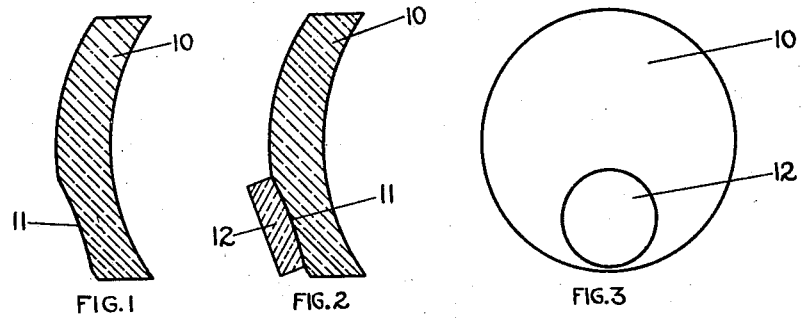
Fig. 1 shows a vertical sectional view of a major lens member with a countersink formed in one surface.
Fig. 2 shows a sectional view of a lens blank with a minor lens member fused in the countersink.
Fig. 3 is a face view of the lens blank shown in Fig. 2.
Fig. 4 shows a portion of a chart illustrating the application of my invention
Fig. 5 shows a portion of a chart illustrating the application of the prior art.

In the manufacture of a well known type of multifocal lens, a major lens member 10 has a countersink or curved depression 11 ground and polished on one of its surfaces. A minor lens member 12, also known as a disc or button, having a ground and polished surface, is then fused into the countersink 11 with its polished surface in contact with the countersink. The refractive index of the major member 10 is different from the refractive index of disc 12, the disc having the higher refractive index. This procedure produces what is known as an unfinished multifocal blank, shown in Figs. 2 and 3.

The dioptric power of the reading or near vision portion of a fused multifocal lens is dependent upon the difference between the refractive index of the fused disc and the refractive index of the major blank, the curvature of the countersink and the curve which is ground onto the exterior surface of the fused button or disc, known generally as the disc side curve. It is not practical to vary the refractive index of the disc to provide each different desired power in the reading addition and hence the power of the reading addition is controlled by suitably varying the countersink curvature and the curvature of the exterior surface of the disc or button. For manufacturing reasons it is customary, however, to use a disc of a higher refractive index when a relatively strong power is required in the reading addition. Hence a disc of one refractive index is used for the range of reading additions in the lower powers and a disc of a higher refractive index is used for the range of reading additions of greater power.

The manufacturer makes up a series of unfinished blanks which can be carried in stock by the dispenser and finished by him to the proper desired prescriptive powers. Each blank of this series has a different countersink curve and each blank is serially numbered or designated by an arbitrary symbol or other mark of indicia. Since the curve that is placed over the entire lens on the disc side partly determines the power of the reading addition, a single unfinished blank may often be used to provide a plurality of combinations of disc side curves and reading additions. It is understood, of course, that the surface of the blank which is opposite the disc side is ground and polished in the usual manner to provide the proper combination with the disc side curve so as to afford the desired power for distance vision. Such a series of unfinished blanks is stocked by the dispenser who is provided with a chart, by the manufacturer, for facilitating the selection of the proper blank for a given combination of reading addition and disc side curve.

The foregoing procedure which is in extensive use can be illustrated by reference to Fig. 5 which shows a portion of the chart which is furnished to the dispenser to enable him to select the proper unfinished blank. The numbers from 208 to 223 represent the serial numbers which have been arbitrarily applied to the unfinished blanks. Each serial number designates a particular unfinished blank having a countersink curve which is characteristic of that blank only. In this particular series the blanks are meniscus shaped and all have a +3.00D molded curve on one side and a −6.00D molded curve on the other side. The refractive index of the fused disc or button is the same for all blanks of the series.

The actual practice in the use of the chart of Fig. 5 may be illustrated by considering an example. Thus, suppose that the dispensing optician desires to produce a meniscus lens having a reading addition of 0.75D and a disc side curve of +3.50D. The dispenser then refers to the portion of the chart shown in Fig. 5, runs down the column of disc side curves until he reaches +3.50 and then follows to the right where he finds, in the column headed "Reading Addition 0.75" the number "216". He then selects unfinished blank No. 216 and after grinding a curve of +3.50D on the disc side and a proper curve on the other side to give the desired distance vision power, he will have a finished lens which will provide the proper distance vision together with a reading addition of +.75D. The procedure which has just been described is well known and has been in extensive use for several years.

By referring to Fig. 5 it will be noted that in some cases the same blank number occurs more than once. This, of course, means that a single blank can be used to produce several combinations of disc side curves and reading additions. Notwithstanding this, it is necessary for the dispensing optician to carry a relatively large number of blanks in stock in order to be able to supply any desired combination of disc side curve and reading addition. Although Fig. 5 shows only a small portion of a chart which is used with meniscus blanks, a total number of over 500 blanks are needed to supply any desired combination in flat or meniscus form.

As stated above, the dioptric power of the reading addition of a fused mutifocal lens is controlled or varied by suitably varying the countersink curve and the curve on the exterior surface of the disc, the latter curve being known as the disc side curve. The disc side curve which the dispenser selects is, of course, dependent upon the desired distance vision power and the particular blank which the dispenser selects depends upon the required reading addition.

The disc or button may be of flint glass and the major blank may be made of crown glass and for illustration we will consider a flint disc having a refractive index of 1.616 and a crown blank having an index of 1.523. For these constant indices, a difference of 0.12D in the disc side curve will cause a variation of 0.022+D in the reading addition. This effect is constant, regardless of the dioptric curvature on the disc side of the blank. A lens blank which is finished with a +3.00D curve on the disc side will have an addition of +.526D which is due to the combined effects of the disc side curve and the difference in refractive index between the 1.616 flint and the 1.523 crown. If this same lens blank is finished with a disc side curve of +3.12 it will have an addition of .548D due to the combined effects of the disc side curve and the difference in indices; if finished with a disc side curve of +5.50D this addition will be +0.966D and if finished with a disc side curve of +5.62D this addition will be +0.988D.

By referring to the chart section in Fig. 5 it will be noted that when blank No. 218 is finished with a disc side curve of +3.00D it will have a reading addition of 0.75D. Since the combined effect of the disc side curve and the difference in indices produces an addition of +.526D, the addition produced by the countersink of this blank would be +0.75 minus +.526D or +.224D. Therefore, this same blank, if finished with a +3.12D disc side curve, would have a total reading addition of +.548D plus +.224D or +0.772D.

If this same blank No. 218 is finished with a disc side curve of +5.50D the total reading addition will be 0.966D plus .224D or 1.190D; and if finished with a disc side curve of 5.62D the total reading addition will be 0.988D plus .224D or 1.212D. In the prevailing practice, this blank No. 218 when finished with a disc side curve of either +5.50D or +5.62D has been accepted as providing a total reading addition of +1.25D. It is clear that this practice has introduced errors in the reading addition. Thus when blank No. 218 is finished with a disc side curve of +5.50D the reading addition is actually 1.190D instead of the accepted 1.25D; and when this blank is finished with a disc side curve of +5.62D the reading addition is actually 1.212D instead of the accepted 1.25D. In one of these cases the error in reading addition is .060D and in the other case the error is .038D. In the prevailing practice it is not uncommon to find errors in the reading addition which are of the order of magnitude of .06D or .09D or even still greater. In spectacle lenses an error of .02D is not an appreciable amount and when the lens power exceeds 1.00D errors of .03D or even .04D are acceptable.

By means of my invention I am able to greatly reduce the number of unfinished blanks which a dispenser must carry in stock in order to supply any required reading and distance combination. Besides, I am also able to reduce the errors which occur in the reading additions. These results are obtained by using blanks which have countersink curves which vary and are related in a regular, definite, sequential order instead of in the indefinite and haphazard fashion of the prior art.

The application of my invention can be clearly illustrated by the consideration of some specific examples. In the examples which will be considered, each unfinished blank is composed of a major lens member of crown glass having a refractive index of 1.523 and a minor lens member or disc of flint glass having a refractive index of 1.616. For purposes of illustration, reference will be made to lens blanks which are adjacent and have been designated as Nos. 209 and 210 in one of my improved series of unfinished blanks. Blank No. 209 has a countersink with a curvature of −0.75D and blank 210 has a countersink with a curvature of −1.25D so that the countersink curvatures of these two adjacent blanks differ by 0.50D. The additive effect in the reading addition, caused by the countersink curve and the difference in indices of the flint and crown, amounts to +.131D for blank No. 209 and +.219 for blank No. 210. Similarly, blank No. 211 has a countersink curve of −1.75D and this causes an additive effect of +.307D in the reading addition. Thus for each variation of .50D in the countersink curvature the power of the reading addition is varied by .088D.

The additive effect in the reading addition due to the disc side curve and the difference in indices of the flint and crown glasses is shown in the following tabulation:

| Disc side curve | Additive effect |
|---|---|
| +3.00D | +0.527D |
| 3.12 | 0.548 |
| 3.25 | 0.570 |
| 3.37 | 0.592 |
| 3.50 | 0.614 |
| 3.62 | 0.636 |
| 3.75 | 0.658 |

When a given disc side curve is ground on a given unfinished blank, the combined total effect or actual power of the reading addition can be obtained by adding the effects produced by the disc side curve and the countersink of the blank. Thus, if a curve of +3.00D is ground on the disc side of blank No. 210, the actual power of the reading addition will be 0.527D plus 0.219D or 0.746D. Similarly, if blank No. 209 is finished with a disc side curve of +3.50D, the actual power of the reading addition will be 0.614D plus 0.131D or 0.745D. If this same curve of +3.50D is ground on the disc side of blank No. 210, the actual power of the reading addition will be 0.614D plus 0.219D or 0.833D.

By referring to the section of the chart in Fig. 4, it will be noted that blank No. 210, of my improved series of blanks, when finished with a disc side curve of +3.00D or +3.12D or +3.25D will provide a reading addition of 0.75D, and that this same reading addition will also be provided when blank No. 209 is finished with any disc side curve from +3.37D to +3.75D. In none of these cases is the actual reading addition power exactly equal to the nominal power listed on the chart, for in every case the actual power is either greater or less than the nominal, listed, power of 0.75D.

The examples mentioned in the preceding paragraph have been tabulated below to show the actual powers of the reading additions and also to show the errors caused by the difference between the actual powers and the nominal power of 0.75D:

| Disc side curve | Blank No. | Actual power | Error |
|---|---|---|---|
| +3.00D | 210 | +0.746D | −.004D |
| 3.12 | 210 | .767D | +.017 |
| 3.25 | 210 | .789D | +.039 |
| 3.37 | 209 | .723D | −.027 |
| 3.50 | 209 | .745D | −.005 |
| 3.62 | 209 | .767D | +.017 |
| 3.75 | 209 | .789D | +.039 |

By providing a series of blanks having countersink curves which vary regularly from blank to blank, say in steps of .50D or .25D, I am able to increase the usefulness of each blank. This reduces the number of different blanks required to provide any desired reading and distance combination and enables the dispensing optician to supply any desired lens without carrying as large a stock of blanks as is required under the practice which characterizes the prior art. I am also able to reduce the errors in reading addition powers so that in no case will the errors exceed 0.04D and in the majority of cases will be of the order of .022D or even less.

In the application of my invention it is necessary to revise the chart which is furnished to the dispenser for the purpose of enabling him to select the proper blank. Fig. 4 shows a section of a chart which illustrates the revision made necessary by my invention. The section of the chart shown in Fig. 4 covers the same range of disc side curves and reading additions as is covered by the chart of Fig. 5. By referring to Fig. 4 it will be noted that a total number of 9 lens blanks (Nos. 205 to 213) will provide any disc side curve from 3.00D to 4.12D together with any reading addition from .50D to 1.00D. Under the prior art arrangement illustrated in Fig. 5, however, a total number of 16 blanks (Nos. 208 to 223) are required to supply any combination within the same ranges of power. It is to be understood, of course, that a lens blank number appearing on both Fig. 4 and Fig. 5 does not represent, in each case, a lens blank of the same curve and countersinks, as these lens blank numbers are merely arbitrary designations. Thus blank No. 208 on Fig. 4 would not necessarily have the same countersink curve as blank No. 208 on Fig. 5.

It is obvious, to one skilled in the art, that my invention is not limited to a flint disc having a refractive index of 1.616 or to a crown blank having a refractive index of 1.523. Nor is my invention limited to a method wherein the countersink curvature varies only in .50D steps, for it may vary by other amounts, as .25D or .125D, for instance. Thus for certain ranges of power I use a flint disc having an index of 1.616 and vary the countersink curvature in .50D steps, while for other ranges of power I use a flint disc having an index of 1.69 and vary the countersink curvatures in .25D steps. Although the section of the chart shown in Fig. 4 is applicable to meniscus shaped lenses, it is to be understood that my invention is not limited to lenses of this shape.

I may provide one series of lens blanks to cover one range of powers and other series of lens blanks to cover other ranges of power. Thus one series would comprise blanks in which the countersink curves varied from blank to blank by a fixed amount, say in steps of .50D, with a flint disc of a certain index fused in all the countersinks of the series. Another series could have a flint disc of a different index and a countersink curve variation of, say, .25D. Suitable curves can, of course, be molded on the surfaces of the major blank, as is well known in the art.

From the foregoing it will be apparent that I am able to attain the objects of my invention, and to facilitate the manufacture and dispensation of multifocal lenses, to reduce the number of lens blanks required by the dispenser and to reduce the errors in reading additions of lenses of the character described. It is obvious that various modifications may be made without departing from the spirit of my invention as pointed out in the appended claims.

I claim as my invention:

1. A product in the manufacture of bifocal lenses comprising a set of bifocal lens blanks covering the entire range of reading additions, each of said blanks being formed by fusing a minor lens member in a countersink in a major lens member, said set comprising two series of blanks, one of said series being made up of blanks whose countersink curvatures vary from blank to blank by a fixed amount, the other series being made up of blanks whose countersink curvatures vary from blank to blank by a fixed amount which is different than the fixed amount of said first named series.

2. A product in the manufacture of bifocal lenses comprising a set of bifocal blanks covering the entire range of reading additions, each of said blanks being formed by fusing a minor lens member in a countersink in a major lens member, said set comprising two series of blanks, the blanks of one series having a minor lens member whose refractive index is 1.616 and further having a difference of one-half diopter in countersink curvatures for any two adjacent blanks of the series, the blanks of the other series having a minor lens member whose refractive index is 1.69 and a difference of one-quarter diopter in countersink curvatures for any two adjacent blanks.

LEON V. FOSTER.